April 19, 1927.
E. L. FONSECA
1,625,080
THERMOSTATIC OVEN CONTROL
Filed Feb. 5, 1924
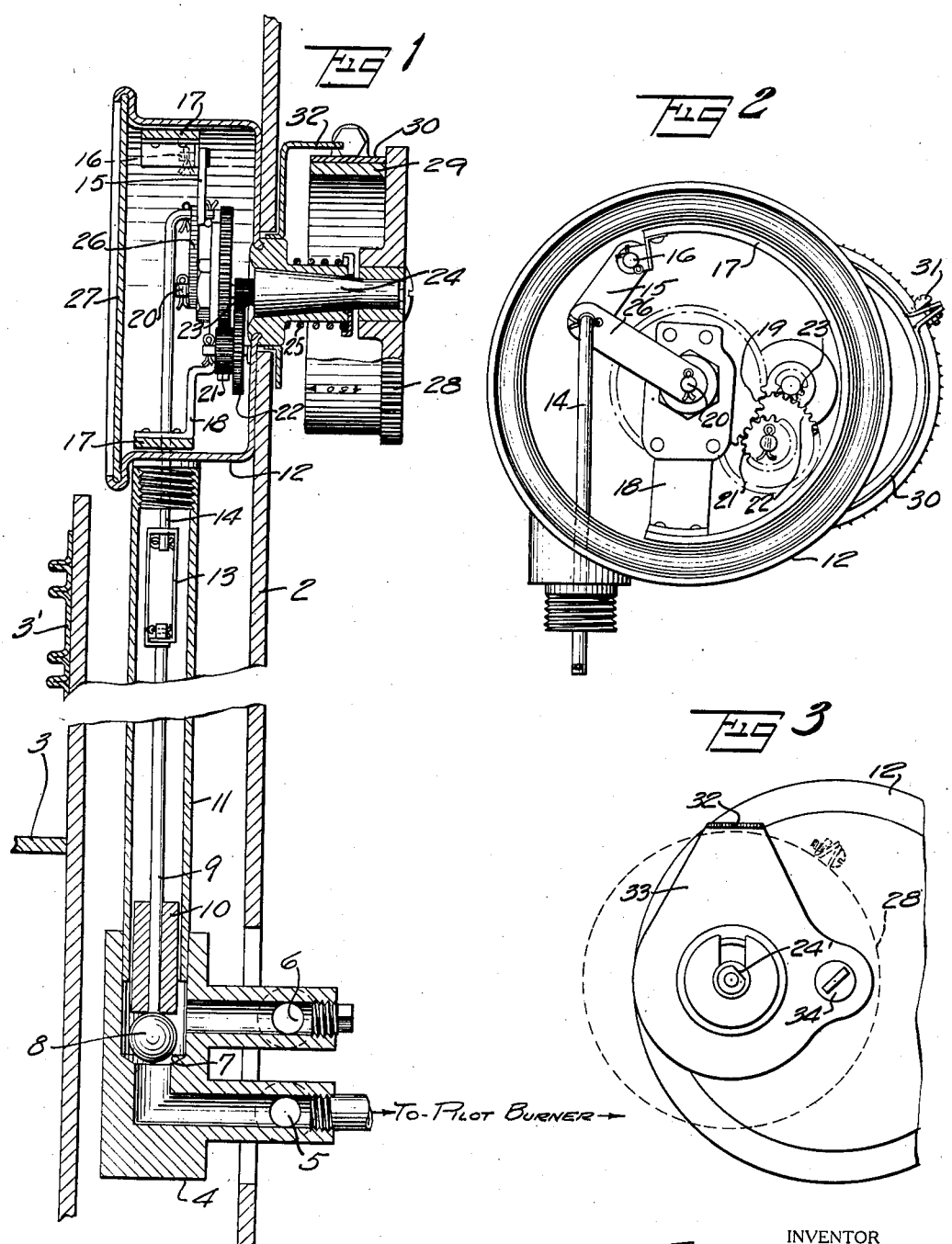
INVENTOR
Edward L. Fonseca.
BY
Cruse + Mann
ATTORNEYS Patented Apr. 19, 1927.

1,625,080

UNITED STATES PATENT OFFICE.

EDWARD L. FONSECA, OF NEWARK, NEW JERSEY, ASSIGNOR, BY MESNE ASSIGNMENTS, TO THE WILCOLATOR COMPANY, OF NEWARK, NEW JERSEY, A CORPORATION OF DELAWARE.

THERMOSTATIC OVEN CONTROL.

Application filed February 5, 1924. Serial No. 690,797.

This invention relates to gas oven regulators, and particularly to the type of regulator which may be readily adjusted to maintain any desired temperature within the oven.

The object of the invention is to provide an improved form of thermostatically controlled regulator which is of simple construction and therefore can be manufactured at low cost, which can be readily calibrated, which can be installed upon a stove with a minimum of labor and expense, which can be mounted upon the stove with practically all of the parts other than the manually operated regulating device concealed within the stove structure, which can be readily set to maintain any desired temperature and which is protected against injury to the valve member when resetting for maintaining a different temperature.

One of the distinguishing features of the invention is the employment of a thermostatic strip which is supported at one end and has the movable member of the controlled device suspended from or otherwise secured to its opposite end, and means for adjusting the action of the regulator by moving the strip bodily, this being accomplished by moving the support to which one end of the strip is secured. Preferably the strip is curved to the arc of a circle and the adjustment is effected by small amounts of rotational movement of the support for the strip about the axis of that circle. When the regulator is employed for controlling a valve, the movable member of the valve is preferably suspended from the end of the strip opposite that which is secured to the support and the movement of the curved strip about the axis about which the strip is curved regulates the position of the movable valve member toward and away from its seat. Adjustment of the regulator for different temperatures is preferably effected by a rotatable handle connected through reduction gears to the support for the strip, as movement of the latter over a small range is usually quite sufficient.

In the accompanying drawings which show an illustrative example of a regulator embodying my invention, Fig. 1 is a sectional view (the sections being taken in a number of different planes) of my regulator in position in an oven; Fig. 2 is an oven-side view of the bulb with the cover plate removed; and Fig. 3 is a view of the device from the outside with the indicating dial removed but its position represented.

In these drawings the numeral 2 represents the side wall of the oven and 3 the bottom wall; 3' is the interior wall usually provided in gas ovens to carry the guides on which the oven racks are placed; 4 is a valve manifold having an inlet 5 and an outlet 6. The inlet 5 is connected to the gas supply and the outlet 6 is connected to the oven burner. Between the inlet 5 and the outlet 6 is a valve seat 7 with which cooperates a ball valve 8 carried by a rod 9. A weight 10 may be hung to the rod 9 to insure the valve ball 8 dropping to its lowest permitted position.

Extending up from the valve manifold 4 is a pipe 11 which is located near the front of the oven between the walls 2 and 3'. At its upper end the pipe 11 is connected to the bulb casing 12. At the upper end of the rod 9 is a yoke 13 through a hole in the top of which slides a rod 14. By providing the yoke 13 it is possible for the rod 14 to be moved down even when the valve is closed, as for instance when it is desired to set the regulator for a lower temperature at a time when the valve member 8 is upon or close to its seat. The rod 14 extends up into the casing 12 and is pivoted to the link 15 which in turn is pivotally connected by bracket 16 to a thermostatic element 17. The thermostatic element 17 is of a type composed of two metals combined in such a way that the element is adapted to bend under the influence of heat. In the present instance it is to be noted that the element 17 is substantially semi-circular, and is so arranged that when heated it will bend to reduce its radius and thus permit rod 14 and valve 8 to drop.

The thermostatic element 17 is connected to bracket 18 which in turn is connected to the gear wheel 19 carried on the shaft 20 located at the center of the casing 12. Gear 19 meshes with a small gear 21 which is substantially integral with a gear 22 which in turn meshes with a pinion 23 carried on a bevelled shaft 24 which passes out through the rear of the casing 12. The gears are so arranged that a complete rotation of shaft 24 will cause the element 17 to be moved one-sixteenth of a full revolution, which in the illustrative example shown permits me to cover the ordinary oven ranges of temperature of from 250° to 500° by approximately one rotation of shaft 24.

The shaft 24 is held in close contact with its seat by a spring 25. A link 26 connects the end of rod 15 with the shaft 20 on which the link is loosely mounted and is provided so that rod 14 will be held substantially in the center of pipe 11. The face of the casing 12 is closed by a plate 27 which, after the moving parts of the device are assembled, is fixed in place so as to form a gas-tight joint.

The outer end of shaft 24 has a flat side 24' which serves to hold in predetermined position a disk 28 having an apron 29 around which is placed a band 30 on which may be marked a temperature scale arranged in any desired manner. The ends of the band 30 are turned out and the band 30 may be clamped in place by a nut and bolt 31. The indicator point 32, adapted to cooperate with the temperature markings on the band 30, is carried by a plate 33 which surrounds the seat of shaft 24 and is held in place by a screw 34 which passes through the oven wall 2 into the center of casing 12. By this arrangement the indicator point 32 and the casing 12 are necessarily assembled on the stove in the correct position and the outturned ends of band 30 will contact with point 32 and prevent disk 28 from being given more than one full revolution.

To calibrate this device, it may be applied to a test oven which is heated to a known temperature (for example, 250 degrees F.), and after the correct position of the movable valve member 8 has been found by reference to the known temperature, the nut 31 is loosened and the band 30 is moved about the apron 29 until the correct temperature mark (on the above assumption, the 250 degree mark) on the band 30 is opposite the indicator point 32. The nut 31 is then tightened up so that the band 30 will be clamped firmly in place. When the thermostatic strip employed is one which flexes substantially equal amounts for the same temperature changes throughout its working range, calibration may be effected without the employment of a test or standard oven; the valve member 8 may be raised a predetermined amount up from the position in which it completely cuts off the flow of gas through the valve by turning the handle 28 a predetermined amount, and then, while holding the handle against movement, the band 30 may be secured to the apron of the handle with a selected scale marking on the band in alignment with the index 32.

When the device is to be put in the oven in which it is to be used, the disk 28 and plate 33 are removed from shaft 24, and since the parts can only be reassembled in one way, no further adjustments will be necessary.

It may be noted that the arrangement here shown provides means for moving the thermostatic element bodily, and it is apparent that as shaft 24 is rotated in such a manner as to move element 17 in a counter-clockwise direction as viewed in Fig. 2, the amount of heat necessary to lower valve 8 against its seat will be reduced. This does away with the necessity of complicating the device by interposing adjusting means between the valve and the thermostatic element and (except for emergency slip provided by member 13) there is a uniform relationship between the position of the valve and the position of that part of the thermostatic element to which the valve is connected.

Experience has shown that in the form of device here illustrated, the operation will show a satisfactory degree of accuracy and uniformity within the ordinary oven temperatures, particularly if the thermostatic element is made sufficiently large. I have found that satisfactory results can be obtained with a thermostatic element substantially as shown in the drawings having a radius of about one and three-eighths of an inch.

It is to be understood that the particular form of device here shown and described is intended for purposes of illustration only and that many modifications may be made in the details and form or construction without departing from the spirit of my invention.

What I claim is:

1. In a device of the type described, the combination of a casing, a thermostatic element adapted to bend under the influence of heat located within the said casing, a valve, means extending out of such casing for moving said element bodily substantially along the line of its length and an operative connection between said valve and said element, such that the temperature necessary to close said valve may be varied by such bodily movement of said element.

2. In a device of the type described, the combination of a curved thermostatic element adapted to bend under the influence of heat, means for holding one end of said element, a valve, means connecting said valve and the free end of said element adapted to operate said valve by utilizing the circumferential component of the movement of the free end of said element and a manually adjustable member for moving the element bodily in a circumferential direction.

3. The combination of a casing adapted to be exposed to heat, a valve outside the casing at a distance therefrom, a movable support within the casing, a thermostatic element within the casing and secured to the support, this element having a part movable to different positions in accordance with temperature changes, a connection between this part of the element and the valve, a gas-tight housing for the connection extending between the casing and the valve, and adjustable means extending through the wall of the casing for shifting the support and thereby moving the element bodily to alter the position of the valve.

4. In a device of the type described, the combination of a gas-tight casing having a pipe connection, a thermostatic element in said casing, a valve control rod connected with said element and extending out of said casing, mechanism within said casing for moving said element bodily to move said rod and a shaft for operating said mechanism extending through the wall of said casing and forming a gas-tight joint therewith.

5. In a device of the type described, a thermostatic element, a valve operatively connected therewith, manually operable mechanism for moving said element bodily to change the position of the valve, a scale carried by such mechanism, and means adapted to allow the scale to be moved to any desired position relative to such mechanism and to be clamped in such position.

6. In a device of the type described, a thermostatic device adapted to be placed in an oven, a control member extending through the wall of the oven, an indicator point adapted to be mounted outside the oven wall, a control disk movable in relation to such indicator point, a connection between said control disk and said control member, such that said control disk and control member can be assembled in only one relative position and means for mounting said indicator point so that the same can be mounted in only one position.

7. In a device of the type described, a thermostatic element adapted to be placed in an oven, a gas valve, means for operatively connecting said valve and said thermostatic element, a control member for said valve adapted to extend through the oven wall, a stop adapted to be mounted outside of the oven wall, a temperature scale carrying a stop adapted to cooperate with said first stop, and two connections between said control member and said scale, one being such as to permit the scale to be moved into various operative positions relative to such control member and the other being such as to limit the position of the scale and the control member to a predetermined position.

8. The combination of an oven, a valve adapted to control the supply of fuel for such oven, a temperature controlling device disposed within the oven walls at a distance from the valve and operatively connected to the valve, a shaft extending through the oven walls and operable to vary the action of the device on the valve, a fixed indicator point outside the oven, a dial carried by the shaft having markings adapted to cooperate with the indicator point, and means for adjusting the position of the dial relative to said shaft.

9. In a device of the type described, a substantially cylindrical casing, a thermostatic element having a portion adjacent the curved inner wall of said casing, a mounting connected with one end of said element adapted to pivot about the approximate axis of said casing, a valve control rod connected approximately tangentially to the other end of said element and means extending out of said casing for manually turning said mounting.

10. In a device of the type described, a curved thermostatic element adapted to bend under the influence of heat and intended for use within a predetermined range of temperatures, a mounting for one end of said element adapted to permit such element to be moved bodily substantially along the line of its curvature, an indicator dial and gearing connecting said dial and said mounting such that substantially one complete rotation of said dial will compensate for the difference in circumferential position of the free end of said element at the extremes of such predetermined range of temperatures.

11. The combination of a thermostatic element in the form of a bi-metallic strip having a part movable to different positions in accordance with temperature variations due to the warping of the strip in a direction transverse to its length, a valve including a movable member and seat, a link connected directly to the movable part of the strip and to the movable valve member in such manner that the movable valve member is moved by the said part as changes in temperature occur, and a manually operable member connected to the strip for moving the strip bodily in the direction of its length to change the position of the movable valve member relative to its seat.

12. A thermostatic controller comprising the combination of a thermostatic element which is curved in the direction of its length, a valve having a movable valve member which is connected to one end of the thermostatic element, and means connected to the other end of the element for moving the element bodily in the direction of its length and about substantially the center about which the element is curved to adjust the position of the movable valve member with reference to the portion of the valve with which it cooperates.

13. A thermostatic controller comprising the combination of a thermostatic strip curved lengthwise about a center, a support secured to one end of the strip and pivotally mounted to turn substantially about said center, a handle connected through reduction gears to said support for turning it about its pivot, and a device whose position is to be varied in accordance with changes of temperature connected to the end of the strip opposite to that which is secured to the support.

14. A thermostatic controller comprising the combination of a thermostatic element which is curved in the direction of its length, a valve having a movable valve member, a rod on which said member is mounted, a link pivotally connected at one end to one end of the rod and at the other to one end of the element, a pivotally mounted link for guiding the point of connection between said link and rod, a pivotally mounted support for the thermostatic element connected to the end thereof opposite that to which the link is connected and an operating device connected to the support for turning the latter about its pivotal mounting.

15. A thermostatic controller comprising the combination of a thermostatic element, a valve having a valve member movable toward and away from a seat, a connection from one end of the thermostatic element to the movable valve member having a slip joint therein, and means connected to the other end of the thermostatic element for moving the element bodily to adjust the position of the movable valve member relatively to its seat.

16. A thermostatic controller comprising the combination of a thermostatic element, a valve including a valve member movable toward and away from a seat, a connection from one end of the thermostatic element to the movable valve member formed in two parts which are connected together so as to permit them to move relatively, and means connected to the other end of the element for moving the element bodily to adjust the position of the movable valve member relatively to its seat.

17. The combination of a thermostatic element in the form of a bi-metallic strip having a fixed end and a free end, the latter being movable to different positions in accordance with temperature changes due to the warping of the strip in a direction transverse to its length, a support on which the fixed end of the strip is mounted, a device having a movable part, the position of which is to be varied in accordance with temperature changes, a link connecting the free end of the element and the said movable part, and means for shifting the support to move the strip bodily in a direction at an angle to the direction in which the said strip warps.

18. The combination with a gas stove having an oven provided with a side wall and an interior wall parallel to and spaced from the side wall and carrying the supports for the oven racks, of a thermostatic temperature regulator comprising a thermostatic element wholly mounted within the oven between said walls, a valve controlling the supply of fuel to the burner of the oven and a mechanical connection extending from the thermostatic element through the space between the said side wall and the said interior wall to the said valve through which connection the element operates to position the valve.

19. The combination with a gas stove having an oven provided with a side wall and an interior wall parallel to and spaced from the side wall and carrying the supports for the oven racks, of a thermostatic temperature regulator comprising a thermostatic element wholly mounted within the oven between said walls, a valve controlling the supply of fuel to the burner of the oven, a mechanical connection extending from the thermostatic element through the space between the said side wall and the said interior wall to the said valve through which connection the element operates to position the valve, and a manually adjustable member mounted on the stove outside the oven and having a portion extending through the oven wall, this member being operable to regulate the effect of movements of the said element in response to temperature changes upon the position of the valve.

20. The combination with a gas stove having an oven provided with a side wall and an interior wall parallel to and spaced from the side wall and carrying the supports for the oven racks, of a thermostatic temperature regulator comprising a thermostatic element mounted within the oven between said walls, a valve controlling the supply of fuel to the burner of the oven, a tube extending from the said regulator through the space between the said side wall and the said interior wall to the casing of said valve, and a rod extending through said tube and coacting at one end with the thermostatic element and at the other with the valve, said rod serving to transmit movements of the element to the valve.

21. A thermostatic controller comprising the combination of a thermostatic element curved in the direction of its length and adapted to have such curvature increased and diminished with changes of temperature, a device, the position of which is to be varied in accordance with the temperature changes, connected to the thermostatic element and movable to different positions thereby in accordance with the change in the curvature thereof, and means connected to the thermostatic element for moving the element bodily along a curved path to change the position to vary its action upon the said device.

EDWARD L. FONSECA.